US009703274B2

(12) United States Patent
Li (10) Patent No.: US 9,703,274 B2
(45) Date of Patent: Jul. 11, 2017

(54) METHOD FOR SYNERGISTIC OCCUPANCY SENSING IN COMMERCIAL REAL ESTATES (71) Applicant: TELEFONAKTIEBOLAGET L M ERICSSON (PUBL), Stockholm (SE)

(72) Inventor: Du Li, Palo Alto, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 822 days.

(21) Appl. No.: 13/763,202

(22) Filed: Feb. 8, 2013

(65) Prior Publication Data
US 2014/0107846 A1  Apr. 17, 2014

Related U.S. Application Data (60) Provisional application No. 61/713,111, filed on Oct. 12, 2012.

(51) Int. Cl.
G05B 13/00 (2006.01)
G05B 15/00 (2006.01)
(Continued)

(52) U.S. Cl.
CPC .......... G05B 15/02 (2013.01); F24F 11/0034 (2013.01); H04W 4/006 (2013.01);
(Continued)

(58) Field of Classification Search
CPC ............ G05B 15/02; G05B 2219/2642; G05B 2219/2614; H04W 4/006; H04W 4/04;
(Continued)

(56) References Cited

U.S. PATENT DOCUMENTS

| 6,909,921 | B1 * | 6/2005  | Bilger | 700/19 |
| 7,647,171 | B2   | 1/2010  | Horvitz et al. | |
| 7,848,853 | B2 * | 12/2010 | Milder et al. | 700/278 |
| 8,695,888 | B2 * | 4/2014  | Kates | 236/49.3 |

(Continued)

FOREIGN PATENT DOCUMENTS

| EP | 2141957 | 1/2010 |
| WO | WO-0172060 | 9/2001 |

OTHER PUBLICATIONS

Agarwal, Y , et al., "Duty-cycling buildings aggresively: The next frontier in HVAC control", *Information Processing in Sensor Networks (IPSN), 2011 10th International Conference on*, IEEE, (2011), 258-269.

(Continued)

*Primary Examiner* — Ziaul Karim
(74) *Attorney, Agent, or Firm* — Nicholson, De Vos, Webster & Elliot, LLP (57) ABSTRACT

A method to synergistically sense occupancy inside a building. A coarse-grained sensor in the building generates a coarse data indicating a user is in a large area including a control zone. A fine-grained sensor in the building generates a fine data indicating the user is in a small area. The fine data is more accurate but less reliable than the coarse data. The method to improve energy efficiency by generating an actuation plan for the control zone. The method includes receiving the coarse data and the fine data, normalizing the coarse data and the fine data, checking for an overlap between the large area and the small area, calculating a change in occupancy in the control zone based on the normalized coarse data if there is no overlap and based on the normalized fine data if there is overlap, and generating the actuation plan based on the change in occupancy.

14 Claims, 5 Drawing Sheets

(51) Int. Cl.
| | |
|---|---|
| G05B 23/00 | (2006.01) |
| G05B 15/02 | (2006.01) |
| F24F 11/00 | (2006.01) |
| H04W 4/04 | (2009.01) |
| H04W 4/00 | (2009.01) |
| H04W 64/00 | (2009.01) |
| G01S 5/02 | (2010.01) |
| G01S 15/04 | (2006.01) |
| G01S 15/02 | (2006.01) |
| H04L 29/08 | (2006.01) |
| H04W 4/02 | (2009.01) |

(52) U.S. Cl.
CPC ............ H04W 4/04 (2013.01); H04W 64/00 (2013.01); *G01S 5/0252* (2013.01); *G01S 5/0257* (2013.01); *G01S 15/025* (2013.01); *G01S 15/04* (2013.01); *G05B 2219/2614* (2013.01); *G05B 2219/2642* (2013.01); *H04L 67/24* (2013.01); *H04W 4/02* (2013.01)

(58) Field of Classification Search
CPC .. G01S 2013/468; G01S 15/04; G01S 5/0252; G01S 1/06; G01S 2013/466; Y02B 60/50; F24F 11/0034
USPC .................................................. 700/275–277
See application file for complete search history.

(56) References Cited

U.S. PATENT DOCUMENTS

| | | | |
|---|---|---|---|
| 2004/0002792 A1* | 1/2004 | Hoffknecht ............ | G05B 15/02 700/295 |
| 2005/0243936 A1 | 11/2005 | Agrawala et al. | |
| 2007/0202887 A1 | 8/2007 | Counts et al. | |
| 2009/0158367 A1* | 6/2009 | Myers ....................... | G06F 9/54 725/109 |
| 2009/0307255 A1* | 12/2009 | Park ........................ | G06Q 10/10 |
| 2011/0018732 A1 | 1/2011 | Cho et al. | |
| 2011/0287779 A1* | 11/2011 | Harper ....................... | 455/456.1 |
| 2012/0044355 A1 | 2/2012 | Jamtgaard et al. | |
| 2012/0046044 A1 | 2/2012 | Jamtgaard et al. | |
| 2012/0058782 A1 | 3/2012 | Li | |
| 2012/0143357 A1* | 6/2012 | Chemel et al. ................. | 700/90 |
| 2012/0143810 A1* | 6/2012 | Berg-Sonne .................... | 706/47 |
| 2012/0244875 A1 | 9/2012 | Cardona et al. | |
| 2013/0079031 A1 | 3/2013 | Kuhn et al. | |
| 2013/0226320 A1* | 8/2013 | Berg-Sonne et al. ........... | 700/90 |
| 2013/0281118 A1 | 10/2013 | Lipman et al. | |
| 2013/0344888 A1 | 12/2013 | Dousse | |
| 2014/0101082 A1* | 4/2014 | Matsuoka ........... | H04L 12/2829 706/12 |

OTHER PUBLICATIONS

Bahl, P , et al., "RADAR: An in-building RF-based user locaiton and tracking system", *Proceedings of IEEE Infocom Conference*, (2000).

Emmerich, Steven J., et al., "State-of-the-Art Review of CO2 Demand Controlled Ventilation Technology and Application", *US Dept of Commerce, National Institute of Standars and Technology*, Gaithersburg, (2001), 47 Pages.

Erickson, V , et al., "OBSERVE: Occupancy-based system for efficient reduction of HVAC energy", *Information Processing in Sensor Networks (IPSN), 2011 10th annual international conference on Mobile computing and networking (MobiCom '04)*, ACM, New York, NY, USA, (2011), 70-84.

Ghai, Sunji K., et al., "Occupancy Detection in Commercial Buildings using Opportunistic Context Sources", *Work in Progress session at IEEE PerCom conference*, (Mar. 2012).

Haeberlen, Andreas , et al., "Practical Robust Localization over Large-Scale 802.11 Wireless Networks", *Proceedings of the 10th annual international conference on Mobile computing and networking (MobiCom '04)*, ACM, New York, NY, USA, (2004), 70-84.

Jiang, Yifei , et al., "MAQS: a mobile sensing system for indoor air quality". *Proceedings of the 13th international conference on Ubiquitous computing (UbiComp.'11)*, ACM, New York, NY, USA, (2011), 493-494.

King, Thomas , et al., "A Location System based on Sensor Fusion: Research Areas and Software Architecture", University of Mannheim, (May 19, 2005), 33 Pages.

Madigan, David , et al., "Bayesian Indoor Positioning Systems", *Proceedings of IEEE Infocom*, Miami, Florida, (Mar. 2005).

Martani, Claudio , et al., "ENERNET: Studying the dynamic relationship between building occupancy and energy consumption", *Energy Buildings*, doi:10.1016/j.enbuilding.2011.12.037, (2012).

Tarzia, et al., "Sonar-based measurement of user presence and attention". *Proceeding of ACM Ubicomp conference*, (2009), 4 pages.

Thanayankizil, L , et al., "Softgree: Towards energy management of green office buildings with soft sensors", *Energy in communications, Information, and Cyber-physical Systems (E6) Workshop, Comsnets*, IEEE, (2012).

Li, Du , et al., "A Wi-Fi Based Occupancy Sensing Approach to Smart Energy in Commercial Office Buildings", *Embedded Sensing Systems for Energy-Efficiency in Buildings, ACM*; Nov. 6, 2012; pp. 197-198.

Thanayankizil, Lakshmi V., et al., "Softgreen: Towards Energy Management of Green Office Buildings with Soft Sensors", *COMSNETS, 2012 Fourth International Conf on, IEEE*, Jan. 3, 2012; pp. 1-6.

Youssef, Moustafa , et al., "The Horus location determination system", *Wireless Networks; The Journal of Mobile Communication, Computation and Information*; vol. 14, No. 3; Jan. 4, 2007; pp. 357-374.

Non-Final Office Action, U.S. Appl. No. 13/763,298, dated Oct. 8, 2014, 22 pages.

Notice of Allowance, U.S. Appl. No. 13/763,298, dated Feb. 5, 2015, 12 pages.

* cited by examiner

METHOD FOR SYNERGISTIC OCCUPANCY SENSING IN COMMERCIAL REAL ESTATES

CROSS-REFERENCE TO RELATED APPLICATIONS

This application claims the benefit of U.S. Provisional Application No. 61/713,111, filed Oct. 12, 2012, which is hereby incorporated by reference.

FIELD OF THE INVENTION

The embodiments of the invention relate to the field of occupancy sensing. Specifically, the embodiments relate to using multiple types of sensors synergistically to determine occupancy in a building.

BACKGROUND

Occupancy sensing uses data collected from sensors to derive occupancy information for particular areas of a building, including which areas of the building are occupied, how many occupants there are, and who the occupants are. Occupancy sensing can be utilized by a broad range of applications, such as building automation systems and public safety systems, to improve quality or to add new functionality. For some of these applications, occupancy sensing can be added for little cost and can provide a high financial return. For example, according to the U.S. Department of Energy, commercial buildings accounted for 19% of the total energy consumption in the U.S. in 2010. Occupancy sensing can be deployed in these commercial buildings by leveraging existing network and information technology (IT) assets to reduce energy consumption, and thereby reduce utilities costs while also providing environmental benefits.

Typical commercial office buildings use static scheduling policies in their building automation systems, which usually make worst-case assumptions about occupancy. For example, a building can have a policy of turning on the heating, ventilation and air conditioning (HVAC) system and lights from 5:00 a.m. to 8:00 p.m. during weekdays. However, most employees are in the office from 9:00 a.m. to 5:00 p.m. If the building automation system is enhanced with occupancy sensing, then the HVAC system and lights could be turned off in these offices from 5:00 a.m. to 9:00 a.m. and from 5:00 p.m. to 8:00 p.m., resulting in significant energy savings.

The most common occupancy sensors found in the market are motion sensors, which use passive infrared (PIR) to detect whether someone is moving in an area. However, there are several limitations with motion sensors. They can fail when the occupant is not moving, and they do not provide directional information (e.g., whether a person is entering or exiting a room). They also do not provide information on the number of occupants, and the cost of deployment can be high because at least one motion sensor must be installed in each area of interest.

SUMMARY

In one embodiment, a method is executed by a computer system implementing a building automation system to synergistically sense occupancy inside a building. The building includes a plurality of control zones, a coarse-grained sensor, and a fine-grained sensor. The coarse-grained sensor generates a coarse data indicating that a user is in a large area of the building. The large area includes a control zone in the plurality of control zones and is larger than the control zone. The fine-grained sensor generates a fine data indicating that the user is in a small area of the building. The small area is equal in size to or smaller than the control zone. The fine data is more accurate but less reliable than the coarse data. The method to improve energy efficiency in the building by generating an actuation plan for the control zone based on the coarse data and the fine data. The method includes receiving the coarse data from the coarse-grained sensor and receiving the fine data from the fine-grained sensor. The coarse data is normalized into a normalized coarse data and the fine data is normalized into a normalized fine data, the normalized coarse data and the normalized fine data having a common format. A check is made for an overlap between the large area of the building and the small area of the building. A change in occupancy in the control zone is calculated based on the normalized coarse data in response to finding that there is no overlap. The change in occupancy in the control zone is calculated based on the normalized fine data in response to finding that there is overlap. The actuation plan for the control zone is generated based on the change in occupancy in the control zone.

In another embodiment, a computer system implements a building automation system to synergistically sense occupancy inside a building. The building includes a plurality of control zones, a coarse-grained sensor, and a fine-grained sensor. The coarse-grained sensor generates a coarse data indicating that a user is in a large area of the building. The large area includes a control zone in the plurality of control zones and is larger than the control zone. The fine-grained sensor generates a fine data indicating that the user is in a small area of the building. The small area is equal in size to or smaller than the control zone. The fine data is more accurate but less reliable than the coarse data. The computer system to improve energy efficiency in the building by generating an actuation plan for the control zone based on the coarse data and the fine data. The computer system comprises a transceiver port and a computer processor coupled to the transceiver port.

The transceiver port is configured to receive the coarse data from the coarse-grained sensor, and to receive the fine data from the fine-grained sensor. The computer processor is configured to execute a normalizing module and a synergistic control module. The normalizing module is configured to normalize the coarse data into a normalized coarse data, and to normalize the fine data into a normalized fine data, the normalized coarse data and the normalized fine data having a common format. The synergistic control module is configured to check for an overlap between the large area of the building and the small area of the building, to calculate a change in occupancy in the control zone based on the normalized coarse data in response to finding that there is no overlap, to calculate the change in occupancy in the control zone based on the normalized fine data in response to finding that there is overlap, and to generate the actuation plan for the control zone based on the change in occupancy in the control zone.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smart phones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

The embodiments of the invention described herein below provide a method and system for implementing a building automation system to synergistically sense occupancy inside a building. Existing network and information technology (IT) assets can be leveraged as sensors to provide sensor data for the system. The sensor data can then be normalized such that an actuation plan can be generated to control the heating, ventilation and air conditioning (HVAC) system and lighting for improved energy efficiency.

Researchers have shown that occupancy-based building automation systems can reduce HVAC energy consumption by roughly 40%. However, existing techniques for collecting real-time occupancy data can be inaccurate, unreliable, and/or costly to deploy in large scale environments. For example, the most common occupancy sensors on the market are motion sensors. Motion sensors can generate misleading data in some situations (e.g., when an occupant is not moving) and the cost of deployment can be high depending on the size of the building.

Other occupancy sensing solutions use carbon dioxide ($CO_2$) sensors, acoustic/sonar sensors, video cameras, or short-range radio frequency (RF) technologies such as BLUETOOTH. Among these solutions, $CO_2$ sensors are slow to detect changes in occupancy. Hence, they are more suitable for residential homes where occupants are less dynamic than those in commercial office buildings. Furthermore, these solutions all require specialized sensors to be installed in the building, which can result in high deployment costs.

There are also sensor fusion proposals that use multiple types of sensors for collecting occupancy data. For example, a Wi-Fi based system can be combined with video camera sensors to improve accuracy. The video cameras can track and locate an occupant accurately, but cannot provide data regarding the identity of the occupant. The Wi-Fi based system is less accurate, but can provide data identifying the occupant. By considering the temporal-spatial correlation between the video data and the Wi-Fi data, the video data can be used to calibrate the Wi-Fi based system for improved accuracy. Nevertheless, video cameras cannot be installed in all areas of a building due to privacy concerns, thus this proposal is not suitable for some applications.

Another sensor fusion proposal uses a general framework that classifies an occupant's state into one of three categories: in a cubicle, in a meeting room, or taking a break (i.e., not in a cubicle and not in a meeting room). Five different types of "soft" sensors are used for collecting occupancy data: Wi-Fi access point (AP) scans, system activity, instant messaging (IM) client status, calendar, and time of day. Two different machine learning algorithms, linear regression and decision tree, were tested to mechanically map the five sources of data into the three categories. The disadvantages of this proposal include that it requires an extensive set of labeled training data to have a reasonable coverage of cases and achieve a desired level of accuracy. The costs in data collection and model training/calibration can be too steep to be practical.

The embodiments of the present invention overcome the disadvantages of the prior art by incorporating substantial domain knowledge, such as the strengths and weaknesses of different types of sensors. The different types of sensors are divided into categories based on their strengths and weaknesses. In one embodiment, the types of sensors are divided into two broad categories: coarse-grained sensors and fine-grained sensors. The data collected from the different categories of sensors are used synergistically, such that the strengths of one category of sensors are used to compensate for the weaknesses of another category of sensors. Furthermore, each type of sensor is trained independently, instead of training all the different types of sensors together. The advantages of the embodiments described herein below include improved accuracy, lower deployment costs, and the capability of incremental deployment since there is no dependency on any specific type of sensor.

Figure 1:
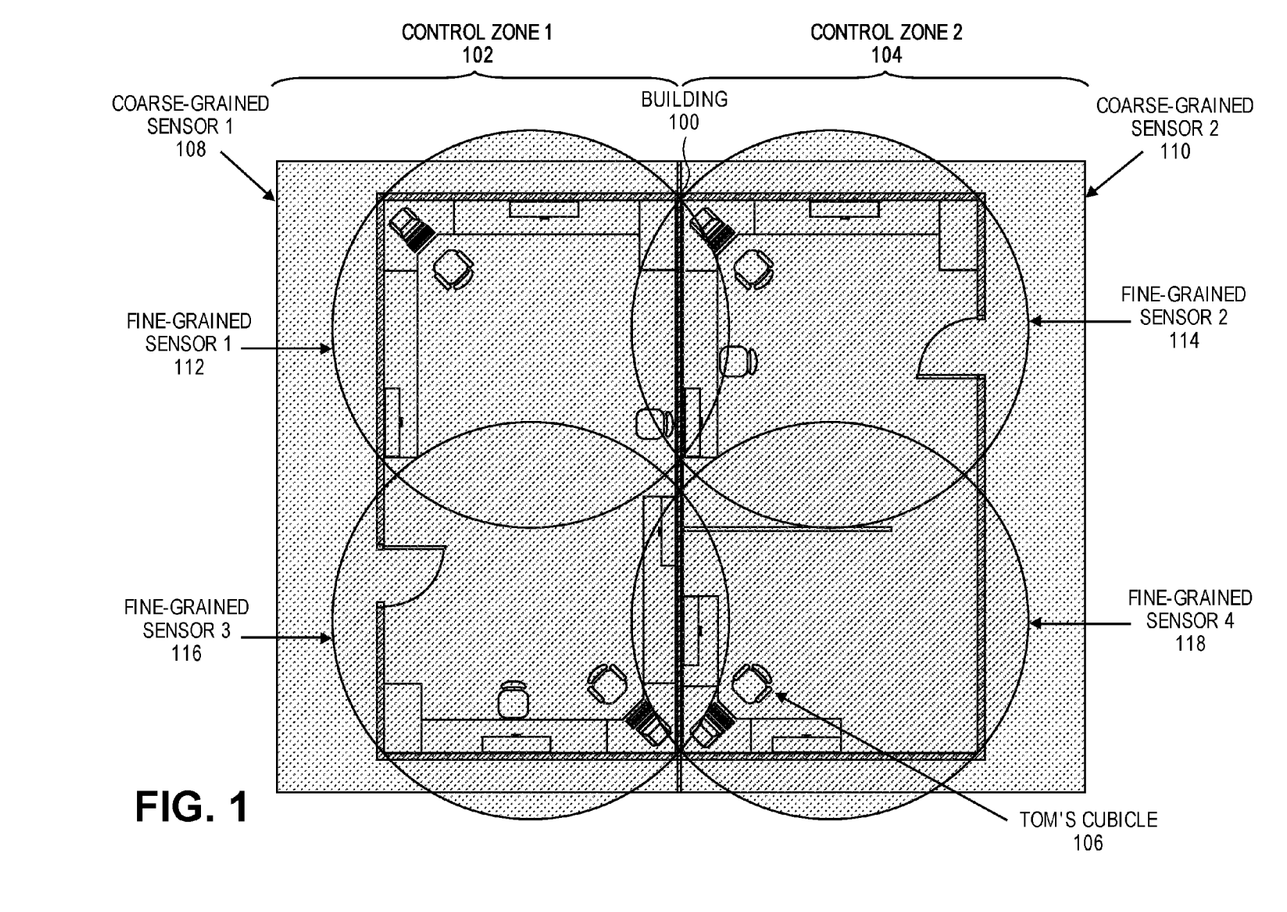
FIG. 1 is a diagram of an exemplary building in which one embodiment of a building automation process that synergistically senses occupancy can be implemented.

FIG. 1 is a diagram of an exemplary building in which one embodiment of a building automation process that synergistically senses occupancy can be implemented. Building 100 includes a first control zone 102 and a second control zone 104. As depicted in FIG. 1, the two control zones 102 and 104 coincide with the two rooms in building 100. Control zones in a building can be defined in any manner, and a building can have any number of control zones. In a preferred embodiment, control zones in a building are defined according to areas that have independent HVAC or lighting controls.

Building 100 also includes two coarse-grained sensors 108 and 110 and four fine-grained sensors 112, 114, 116 and 118. Coarse-grained sensors include sensors that detect occupancy for an area larger than a control zone. For example, a coarse-grained sensor can cover one or more subfloors or floors in a building, or even the entire building. Thus, a coarse-grained sensor can cover the area of one or more control zones. Although the data provided by coarse-grained sensors is less accurate due to their large coverage size, the data can still be useful on its own in certain situations. For example, when a coarse-grained sensor indicates that an area is unoccupied, the HVAC system and lights in the entire area can be turned off or adjusted to save energy.

Fine-grained sensors include sensors that detect occupancy for an area equal in size or smaller than a control zone. Since fine-grained sensors have a smaller area of coverage, they are more accurate than coarse-grained sensors. However, the information derived from fine-grained sensors is not always reliable because deriving the information typically involves making an assumption. For example, a fine-grained sensor can be a mobile device carried by a user. To determine the location of the user through the mobile device, it is assumed that the user is carrying the mobile device. Since this assumption can be false at times (e.g., the user left the mobile device behind in a cubicle), the information derived from the mobile device data is unreliable.

It should be noted that dividing the sensors into coarse-grained and fine-grained categories is only one way of dividing the different types of sensors. For example, in other embodiments, the types of sensors can be divided into more specific categories (e.g., a coarse-grained, a medium-grained, and a fine-grained category). The types of sensors can also be divided into categories according to different criteria, such as reliability or the type of data provided by the sensors (e.g., some sensors provide data identifying the user while other sensors do not). Furthermore, since the coarse-grained and fine-grained categories are defined based on the size of the control zones, there is a possibility that the same type of sensor will be categorized differently in different embodiments. For example, a mobile device sensor can be categorized as a coarse-grained sensor in one embodiment where the control zones are small areas, and it can be categorized as a fine-grained sensor in a different embodiment where the control zones are large areas.

To save on deployment costs, existing network and IT assets that are typically already installed in commercial buildings can be leveraged as "soft" sensors. In some embodiments, the soft sensors can be used to complement actual occupancy sensors, such as motion sensors, for improved accuracy. In other embodiments, only the soft sensors are used for determining occupancy. Several different examples of soft sensors are listed below.

(1) Sniffing Wi-Fi Packets.

Wi-Fi APs are widely installed in modern office buildings for network access. These Wi-Fi APs communicate wirelessly with mobile devices by transmitting and receiving packets, which can contain data or control information. In one embodiment, a wireless sniffing program can be executed on a mobile device to capture all the Wi-Fi data and control packets being transmitted in the air, regardless of the specific channel used or the destination media access control (MAC) addresses of each packet. In other embodiments, the network control center can be tapped to capture the packets, since all packets ultimately flow through switches and routers in the network control center.

The captured packets, especially the control information in the packets, can provide data regarding when a mobile device is in communication with a particular Wi-Fi AP. More specifically, by analyzing the packets in real time, it is possible to determine whether the mobile device is currently associated with the AP and whether data packets are being transmitted between the mobile device and the AP.

Furthermore the locations of the installed APs are known, and the physical coverage area of each AP can be determined by, for example, taking survey scans. Thus, by analyzing the packets, an approximate location for the mobile device can be determined based on the AP that the mobile device is communicating with and the location of that AP. Consequently, the approximate location of the user of the mobile device is known if the assumption that the mobile device goes with the user holds true.

(2) Ethernet Ports.

Similar to sniffing Wi-Fi packets, packets transmitted over a wired medium through Ethernet ports in a building can also be captured at the network control center. Furthermore, Ethernet ports are uniquely identified and have known locations. Therefore, by analyzing the packets to determine which Ethernet port an end station is communicating with, the physical location of the end station can be derived. However, this information is not reliable when used for occupancy sensing because the end station could be communicating without a user being present at the end station. An end station is less reliable as a sensor than a mobile device because end stations are typically stationary and do not go with their users when the users move locations.

To improve the reliability of end stations as occupancy sensors, additional data can be gathered from the end stations. For example, in one embodiment, the end station can indicate whether a user is interacting with the end station. Interaction can be determined if an input device of the end station, such as a keyboard or mouse, is actively being used. In other embodiments, sensors that are installed on the end station, such as a video camera or proximity sensor, can be used to detect the presence of a user.

(3) Sniffing Cellular Networks.

While Wi-Fi sniffing assumes that the user carries a mobile device (typically a smartphone) with Wi-Fi turned on, cellular sniffing is a more general technique that can be used with mobile devices that do not have Wi-Fi capabilities. Some buildings have small cellular base stations, such as femtocells, deployed throughout the building. These small base stations typically connect to the operator's mobile network via a broadband line to provide improved cellular coverage, capacity, voice/data quality, and handset battery life. The range of these small base stations can vary, and the granularity of coverage for using these base stations as sensors will also vary (i.e. shorter ranged base stations means finer-grained sensors). For example, the range of a femtocell is on the order of 10 meters.

The mobile device and the base stations communicate with each other by transmitting cellular signals. These signals can be sniffed/intercepted at different locations. In one embodiment, a mobile device such as a laptop can be equipped with a special antenna or adapter to sniff the cellular signals. In another embodiment, the small base stations can be modified to perform the sniffing. In a further embodiment, since the small base stations are connected via broadband, the packets can be intercepted at the network control center.

Similar to Wi-Fi sniffing, the locations of the small base stations are known. Thus the location of a mobile device can be derived from data indicating which base station the mobile device is communicating with. This data can be extracted from the intercepted signals. It is also possible that the mobile device communicates with several base stations that have overlapping coverage areas, which suggests that the mobile device is near the intersection of those areas.

(4) Tapping into the Security System.

Many commercial office buildings require security clearance before a person is allowed to enter the building. Furthermore, in some buildings such as U.S. federal government buildings, all employees are required to wear a photo badge, while visitors are required to register and wear a visitor badge. In turn, the badge must be swiped to enter/exit the building or certain areas of the building. Security measures similar to badge systems can also be used as an alternative. For example, some buildings might require a key code to be entered before a person is allowed entry into the building.

These badge readers and code entry devices are typically connected to the security computer system. Thus, by tapping into the security system, it is possible to intercept a live stream of data indicating when someone is entering or exiting an area. Depending on the security system, data identifying the person can also be intercepted.

The size of the secured area determines whether the badge reader sensors are coarse-grained sensors or fine-grained sensors. If the secured area is equal to or smaller than a control zone, then it can be classified as a fine-grained sensor. However, if the secured area is larger than a control zone, then it is classified as a coarse-grained sensor.

(5) Tapping into Surveillance Cameras.

Surveillance cameras are installed to monitor public and security-critical areas in a building such as labs and hallways. Technically, it is possible to analyze a video stream to count how many people are in the monitored area. Using face recognition techniques, the identity of each person can also be determined (e.g., using a database that matches faces with identities). The recognition or counting can be triggered by detection of moving objects in the area. The count is increased or decreased as people enter or leave the area. The HVAC and lighting are turned on as long as there are people in the area. They can be turned off when nobody is in the area to save energy.

Surveillance cameras are typically considered coarse-grained because the area that is monitored by a camera is typically larger than a control zone. Furthermore, surveillance cameras are usually not installed in all areas of a building due to privacy concerns. To derive more useful information from camera data, building architecture can be taken into consideration how the monitored areas and unmonitored areas are connected, how the monitored areas and the control zones are related to each other, and how the monitored areas of different cameras overlap). With this information, how a person moves from one area to another can be analyzed. As a result, the number of people in unmonitored areas (and their identities) can be estimated. However, this type of processing is building-specific, which increases the costs of development and deployment.

(6) Indoor Positioning System (IPS) on Mobile Devices.

Mobile devices are widely used, especially in commercial office buildings. Mobile devices use radio communications, such as Wi-Fi or cellular, and communicate with Wi-Fi APs or cellular base stations such as femtocells. Triangulation or trilateration techniques can be used to locate a mobile device that is communicating with APs/base stations if the locations of the APs/base stations are known.

In one embodiment, the mobile device scans radio signals transmitted by APs/base stations and estimates the distances to those APs/base stations using information such as received signal strength indication (RSSI). This can be performed by installing and executing an application or program code on the mobile device. The application can then calculate the location of the mobile device using the locations of the base stations.

In another embodiment, the APs/base stations scan transmissions generated by the mobile device and estimate their distances to the mobile device. The calculations can then be performed by the APs/base stations. Alternatively, data can be collected from the APs/base stations at a separate computer system, such as a computer server, and the calculations can be performed by the computer system.

The two embodiments described above use distance based methods that can be inaccurate in some indoor environments. Many factors contribute to the inaccuracy, including temperature and humidity, layout of the building, furniture, and people, which can all cause signal distortions. Furthermore, the quality of the equipment can have a big impact on accuracy due to factors such as synchronization of oscillator clocks on the APs/base stations. Since distances between APs/base stations can be very short indoors, a small amount of distortion can cause a big difference in positioning results.

Other embodiments use patterns in signals to locate a mobile device. For example, a large number of survey scans can be performed and collected, which can then be analyzed for patterns to fingerprint a building. The patterns can then be used to locate a mobile device, rather than directly using RSSI to estimate distances as the distance based embodiments do. In experiments, pattern based methods are sufficiently accurate in wall-separated areas. However, in open areas such as cubicles, pattern based methods do not have enough accuracy to distinguish between cubicles.

In another embodiment, the space of a building is divided by control zones and a large number of sample scans are collected from each zone. The sample scans can be collected at the physical center of each zone. In other embodiments, sample scans can be collected from subareas in a control zone. For example, if a control zone covers four cubicles, then sample scans can be collected from each cubicle and analyzed for patterns. To locate a mobile device, the patterns are used to find the zone or subarea that the mobile device is most likely to be in.

(7) Collaborative Sensing.

Collaborative sensing allows mobile devices to assist each other in indoor positioning. More specifically, a mobile device not running IPS can communicate with a nearby mobile device that is running IPS to locate itself. The two mobile devices can communicate using short range RF technologies such as BLUETOOTH or near field communication (NFC). BLUETOOTH has a range of about 10 meters while NFC has a range of within tens of centimeters.

(8) Tapping into the Calendar System.

Network calendar systems are widely used in office buildings to manage the scheduling of meeting/conference rooms. For example, calendar programs can typically check the availability of meeting rooms when scheduling a meeting. Similarly, employees can also have a calendar or schedule stored on the network. By tapping into this data, information such as when a room will be occupied, the number of occupants, and the identities of the occupants can be derived.

Table I shown below is a summary of the soft sensors discussed above that utilize existing network and IT assets. The properties that are listed for each type of sensor in Table I are exemplary properties of one embodiment. In other embodiments, each type of sensor can have different properties depending on factors including the layout of the building, the size of the control zones, and equipment quality and features.

TABLE I

| Method | Assumptions | Granularity | User ID Data |
|---|---|---|---|
| Wi-Fi sniffing | Mobile device with Wi-Fi on, going with user | Coarse | Yes |
| Cellular sniffing | Mobile device going with user | Coarse | Yes |
| Ethernet port | User at end station | Medium | Yes |
| Ethernet port with interaction info | | Fine | Yes |
| Security system | | Coarse | Yes |
| Surveillance cameras | | Coarse | Yes if face recognized |
| Cameras with building-specific processing | | Medium | Yes if face recognized |
| Calendar system | Accurate input of and adherence to schedule | Fine | Yes if assumption holds |
| IPS | Run on mobile device, going with user | Fine | Yes |

In addition to using soft sensors, actual occupancy sensors can also be deployed around the building to help achieve more accurate indoor positioning. In one embodiment, sensors can be installed at each area of interest (e.g., control zone, meeting room, private office, and cubicle). Each sensor can broadcast a signal at regular intervals using short-range RF technologies such as BLUETOOTH. When a mobile device is within range of a broadcasted signal, the mobile device can determine its location to be within an area corresponding to the broadcast range of the sensor.

In another embodiment, the deployed sensors can detect when a mobile device is nearby and transmit data identifying the mobile device and location to a computer system through the network. The cost deploying this embodiment will be higher since the sensors require network capabilities. However, the mobile devices do not need to be modified to use this embodiment other than turning on the corresponding radio on the mobile devices.

No individual type of sensor discussed above is perfect in real-world deployment. Some have to work under certain assumptions and they all have varying levels of accuracy. In other words, each type of sensor has strengths and weaknesses. For example, Wi-Fi sniffing and IPS assume that a user's mobile device goes with the user. However, this assumption does not always hold true in the real world. Moreover, some IPS methods do not work on all mobile devices. For example, some mobile platforms distribute the application programming interface (API) for scanning Wi-Fi and cellular signals, which is required for the IPS methods discussed above, while other mobile platforms do not. As another example, the surveillance cameras with building-specific processing do not depend on making assumptions. However, facial recognition, and consequently user identification, can be unreliable with surveillance cameras.

Therefore, to achieve the most accurate occupancy sensing results and the highest energy efficiency in buildings, the different types of sensors can be used together synergistically. Sensed occupancy information can be used to automate the control of HVAC systems and lighting to save energy overall. Furthermore, the information can be provided to the users to promote energy saving behavior such as turning off plug loads, since plug loads typically cannot be turned off automatically.

To illustrate the synergistic use of different types of sensors, an example embodiment is provided using FIG. 1. Building 100 in FIG. 1 also includes Tom's cubicle 106, which is located in the second control zone 104. In this embodiment, the two coarse-grained sensors 108-110 are surveillance cameras that monitor the area depicted by the shaded rectangles in the figure. The four fine-grained sensors 112-118 are Wi-Fi sniffing sensors (e.g., Wi-Fi APs) that have coverage areas depicted by the four shaded circles, which overlap to ensure connectivity. Furthermore, Tom uses a mobile device capable of communicating with the fine-grained sensors 112-118.

If the second coarse-grained sensor 110 detects Tom, and Tom is also detected by the first fine-grained sensor 112, then Tom must be in the upper part of the second control zone 104, near the border of the two control zones. If nobody is detected by the first coarse-grained sensor 108, then the HVAC system and lighting can be turned off in the first control zone 102. Alternatively, if Tom is detected by the fourth fine-grained sensor 118, where his cubicle is located, then HVAC/lighting can also be turned off in the upper area of the second control zone 104.

If Tom ran an IPS application on his mobile device, more accuracy and efficiency can be achieved. If the IPS achieves accuracy at the cubicle level, then HVAC and lighting can be turned off for all areas except Tom's cubicle 106. A Wi-Fi AP or femtocell coverage area can be very large, with a radius of coverage of tens of meters indoors. Therefore, a single Wi-Fi AP or femtocell can cover the area of many control zones. IPS can further increase energy efficiency by narrowing Tom's location down to a single control zone. In addition, more accurate reminders can be sent to Tom (e.g., to turn off his personal plug loads when he is leaving his cubicle).

In another example, Tom leaves his mobile device at his cubicle 106 (e.g., for charging) and walks around in building 100. In this example, the IPS data cannot be relied upon because the assumption that the mobile device goes with the user is false. Nevertheless, the system can fall back on coarse-grained sensors 108-110. If Tom is detected by the first coarse-grained sensor 108, the HVAC/lighting in the first control zone 102 will be turned on. In one embodiment, after a timeout period, the HVAC/lighting in the second control zone 104 is turned off, even though the IPS on the mobile device indicates that Tom is still in his cubicle 106. Therefore, coarse-grained sensors are still helpful even if IPS is widely used.

To avoid over adjusting control zones (i.e., turning HVAC/lighting on and off too frequently), the following assumption can be made. If a user is detected as being active in a large area that encloses the user's office/cubicle, it can be assumed that the user is located in the office/cubicle unless there is data indicating otherwise. For example, if Tom is detected by the second coarse-grained sensor 110 or the fourth fine-grained sensor 118 (which enclose Tom's cubicle 106), it can be assumed that Tom is in cubicle 106. Therefore, the HVAC/lighting covering Tom's cubicle 106 will not be turned off until Tom is detected in another area that does not overlap with Tom's cubicle 106 (e.g., by the first coarse-grained sensor 108) after a timeout period.

Figure 2:
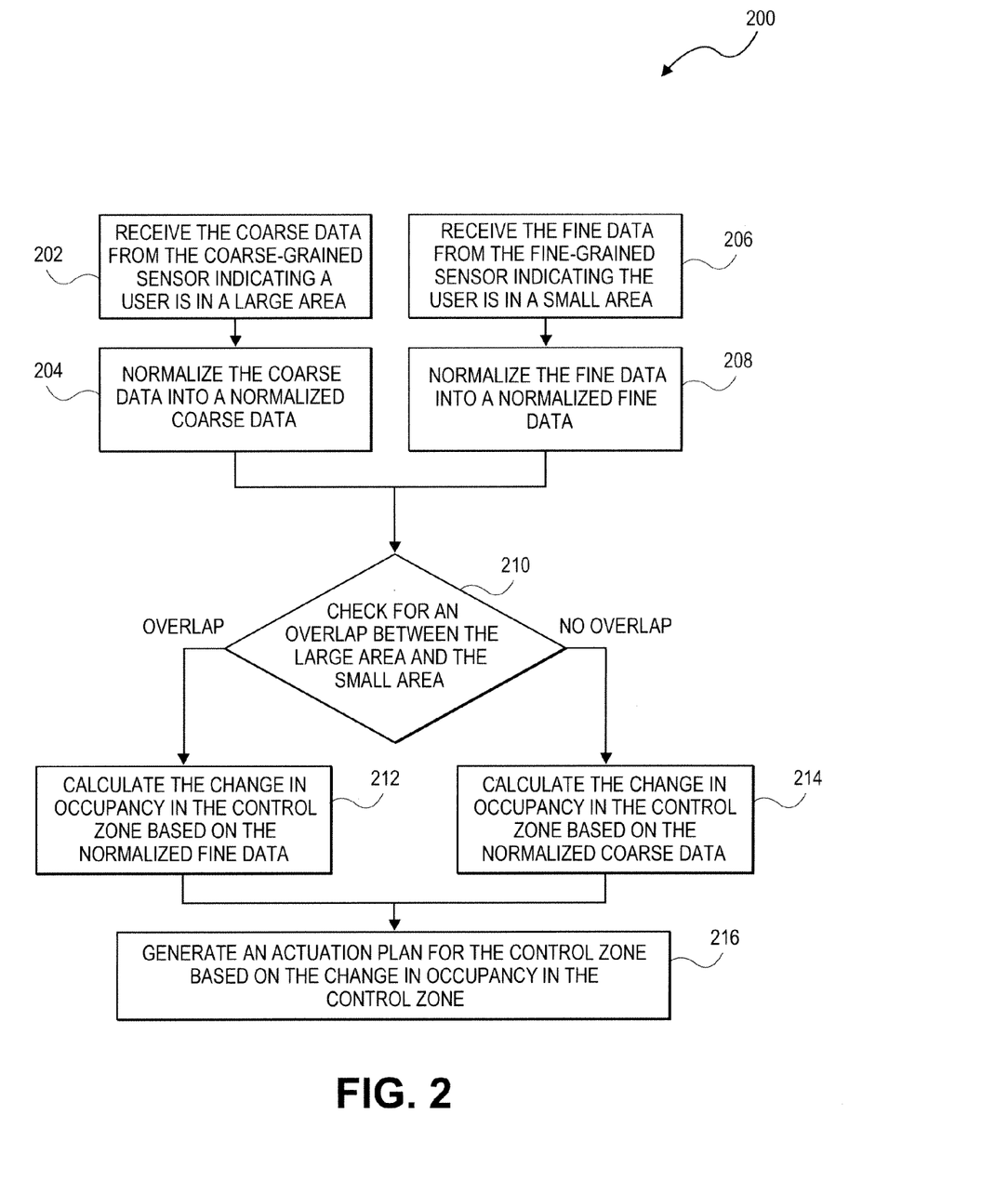
FIG. 2 is a flowchart of one embodiment of a process for implementing a building automation system inside a building to synergistically sense occupancy.

FIG. 2 is a flowchart of one embodiment of a process for implementing a building automation system inside a building to synergistically sense occupancy. The process is typically implemented by a computer system. The computer system can be a distributed system, where multiple computers are coupled to each other through a network and each computer performs a different part of the process. Alternatively, the computer system can be a single computer. The computer system includes at least one computer processor and at least one storage device. The computer processor can be any type of processing device including a general or central processing unit, an application specific integrated circuit (ASIC) or similar processing device. The computer processor can be connected with the storage device by a set of buses routed over a set of mainboards or similar substrates coupled to each other. Alternatively, the computer processor and the storage device can be connected through a network.

In this embodiment, the process can start with either Block 202 or Block 206. At Block 202, coarse data is received from a coarse-grained sensor indicating that a user is in a large area of the building. In this embodiment, a coarse-grained sensor is a sensor that covers an area larger than a control zone and includes at least one control zone. At Block 206, fine data is received from a fine-grained sensor indicating that the user is in a small area of the building. Fine-grained sensors are defined in this embodiment as sensors that cover areas equal to or smaller than a control zone. Fine-grained sensors are more accurate than coarse-grained sensors, but less reliable. The coarse data and the fine data can be received in any order.

Figure 3:
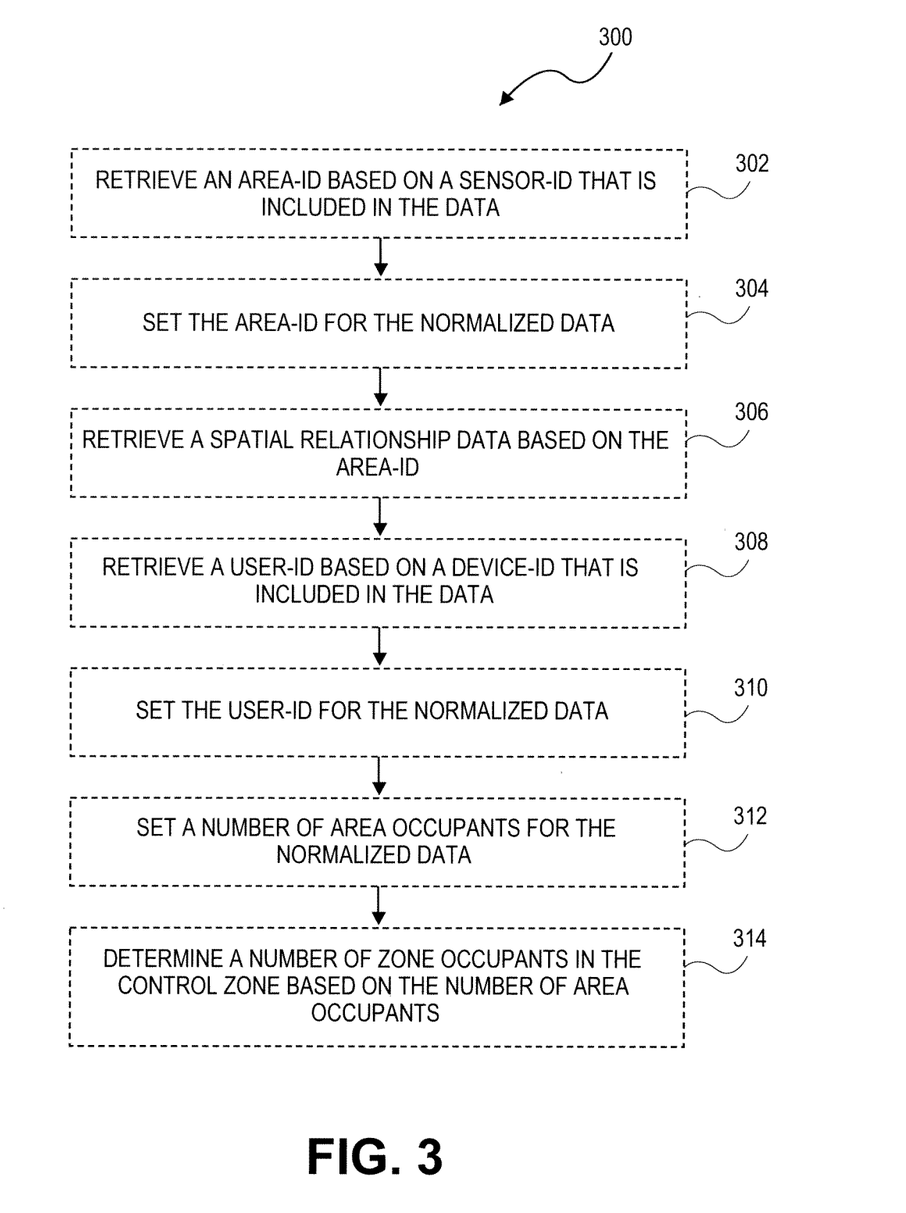
FIG. 3 is a flowchart of one embodiment of a process for normalizing data from a sensor.

After the coarse data is received, the coarse data is normalized into a normalized coarse data (Block 204). After the fine data is received, the fine data is normalized into a normalized fine data (Block 208). The process for normalizing data that is received from a sensor is shown in FIG. 3, which is discussed in greater detail below. In general, each type of sensor can report data in a unique format. The normalization process translates the data that is reported by different types of sensors into a common format so that data received from different types of sensors can be used synergistically.

At Block 210, an overlap is checked for between the large area and the small area using the normalized coarse data and the normalized fine data. To check for the overlap, information regarding the spatial relationships between sensor covered areas can be utilized. In one embodiment, this information can be stored in a database on a storage device. How spatial relationships can be stored is described in further detail below with reference to FIG. 5.

Since the fine-grained sensor is more accurate than the coarse-grained sensor, the change in occupancy in a control zone is calculated based on the normalized fine data if there is an overlap (Block 212). On the other hand, since the coarse-grained sensor is more reliable than the fine-grained sensor, the change in occupancy in the control zone is calculated based on the normalized coarse data if there is no overlap (Block 214).

To determine which control zone the change in occupancy is being calculated for, spatial relationship information can be used similar to when checking for overlap. Since the fine-grained sensor covers an area equal to or smaller than a control zone, the area covered by the fine-grained sensor will typically only overlap with one control zone. In these circumstances, the change in occupancy can be attributed to the overlapping control zone.

However, the fine-grained sensor can overlap with multiple control zones. Furthermore, the coarse-grained sensor can also cover multiple control zones. In these circumstances, the change in occupancy in each of the overlapping control zones can be estimated. In one embodiment, the occupants detected by a sensor can be divided among the overlapping control-zones evenly. For example, if the coarse-grained sensor detects 50 occupants and covers two control zones, then 25 occupants can be attributed to each control zone as an estimate. In other embodiments, the division of occupants can be weighted. For example, in one embodiment, the size of each control zone can be taken into account when dividing the detected occupants such that more occupants are estimated to be in bigger control zones than smaller control zones. Furthermore, the area covered by a sensor can be further divided using physical or logical boundaries, and any combination of these embodiments can be used to achieve the desired level of accuracy and complexity when estimating occupancy.

Figure 4:
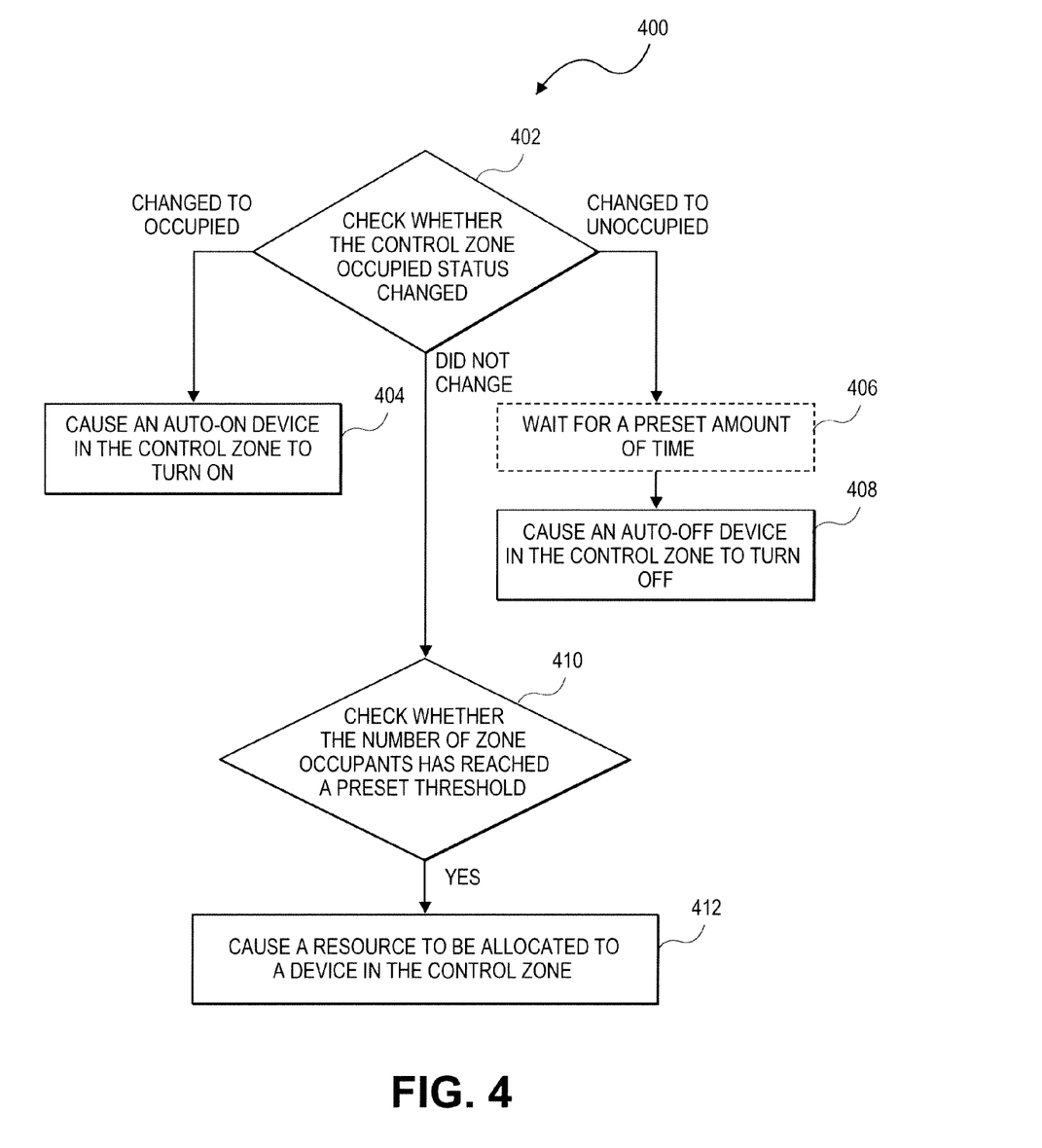
FIG. 4 is a flowchart of one embodiment of a process for actuating a control zone based on occupancy information.

After calculating the change in occupancy for a control zone, an actuation plan is generated for that control zone based on the change in occupancy (Block 216). The process for generating an actuation plan is shown in FIG. 4, which is discussed in greater detail below. In general, the actuation plan causes devices in the control zone to be turned on or off depending on the change in occupancy in the control zone.

FIG. 3 is a flowchart of one embodiment of a process for normalizing data from a sensor. Each type of sensor has its own format for reporting data. For example, a badge reader can report <reader8, badge303, INWARD, 9:50 a.m.>, meaning that the user with badge identification badge303 entered the area monitored by reader8 at 9:50 a.m. A surveillance camera can report <camera5, 2, 6:20 p.m.> to indicate that camera5 detected two people at 6:20 p.m. Wi-Fi sniffers (e.g. APs) can report <AP1, {mac1, mac2}, 8:00 p.m.> and <AP2, {mac2, mac3}, 8:00 p.m.>, indicating that AP1 detected mobile devices with MAC addresses of mac1 and mac2 while AP2 detected mobile devices with MAC addresses of mac2 and mac3 at 8:00 p.m. A mobile device running an IPS client can report <user2, {cube1:0.3, cube2: 0.25 . . . } 10:45 a.m.> to indicate that there is a 30 percent probability that user2 is located in cube1 and 25 percent probability of being located in cube2. The normalization process translates all this data into a common format for processing.

In this embodiment, the process starts by retrieving an area-ID based on a sensor-ID that is included in the data (Block 302). The data can be data received from any type of sensor. This step can be performed using building information such as which area a certain badge reader covers, which area a certain camera monitors, or which area a certain AP covers. In one embodiment, this information can be stored in a database on a storage device. How this information can be stored will be discussed in more specific detail below with reference to FIG. 5. At Block 304, the retrieved area-ID is set for the normalized data.

At Block 306, a spatial relationship data is retrieved based on the area-ID. Spatial relationship data can include information such as which control zone encloses or overlaps with which sensor covered area, as well as spatial relationships between sensor areas.

At Block 308, a user-ID is retrieved based on a device-ID that is included in the data reported by a sensor. This can be performed using information such as mappings from badge-IDs to user-IDs or mobile device MAC addresses to user-IDs. In one embodiment, this information can be stored in a database on a storage device. How this information can be stored will be discussed in more specific detail below with reference to FIG. 5. At Block 310, the retrieved user-ID is set for the normalized data.

At Block 312, the number of occupants for the area that is covered by the sensor is set for the normalized data. In this embodiment, the process keeps track of the number of occupants in the sensor area. In other embodiments, the sensor keeps track of the number of occupants in the covered area and reports the data. At Block 314, the number of occupants in a control zone is determined based on the number of occupants in the sensor area.

In other embodiments, any number of these steps can be performed. In other words, all of the steps discussed above are optional. Depending on the type of sensor, the format of the data reported by the sensors, and the desired functionality, some or all of these steps can be omitted.

The normalized data can have a format such as <area-ID, occupiedStatus, occupantsCount, user-IDs, timestamp>. Area-ID can be a unique identifier for either an area covered by a sensor or a control zone. OccupiedStatus can be a Boolean that indicates whether the area is occupied. OccupantsCount indicates the number of occupants in the area. User-IDs can be an array of unique identifiers corresponding to the users that are occupying the area or zone. Timestamp can be used to indicate the time that the data was recorded. For example, if a badge reader covers area1 and the number of occupants in area1 is six, normalizing the data reported by the badge reader can generate normalized data such as <area1, true, 6, {user3 . . . } 9:50 a.m.>.

In another embodiment, one Wi-Fi sniffer covers area5, a second Wi-Fi sniffer covers area6, and the area where area5 and area6 overlaps is area10. Each area keeps track of a list and the number of detected devices. The data reported by the Wi-Fi sniffers can be normalized into normalized data such as <area5, true, 2, {user1, user2}, 8:00 pm>, <area6, true, 6, {user2, user3 . . . }, 8:00 pm>, <area#10, true, 5, {user2 . . . }, 8:00 pm>. In this embodiment, user2 can be removed from the data for area5 and/or area6 since the data is already kept for area10. In other embodiments, overlapping areas such as area10 are not defined (e.g., due to costs associated with identifying the areas).

IPS data is typically expressed in probabilities, thus the most probable result can be wrong at times. To compensate, any number of top results can be used depending on the desired accuracy. In one embodiment, clustering analysis can be performed on the list of results to identify a gap (e.g., a large jump in value between two results or a number of results needed to reach a certain probability). All results above the gap can be used. If more than one result is used, multiple normalized data can be generated, one for each result.

FIG. 4 is a flowchart of one embodiment of a process for actuating a control zone based on occupancy information. In this embodiment, the process starts by checking whether the control zone occupied status changed (Block 402). The control zone occupied status can change from unoccupied to occupied, in which case the actuation plan would cause one or more auto-on devices in the control zone to turn on (Block 404). Auto-on devices are devices that can be turned on automatically (e.g., HVAC and lighting), in contrast to devices such as plug load devices that should not be turned on automatically. The occupied status can also change from occupied to unoccupied, in which case the actuation plan would cause one or more auto-off devices in the control zone to turn off (Block 408). In one embodiment, the process can also wait for a preset amount of time before turning the devices off (Block 406).

If the occupied status of the control zone did not change, a check is made for whether the number of occupants in the control zone has reached a preset threshold (Block 410). In other embodiments, this check can be performed before checking the occupied status of the control zone. If the number of occupants in the control zone is equal to or greater than the threshold, more resources are allocated to one or more devices in the control zone at Block 412 (e.g., ventilation can be increased). In other embodiments, a similar check can be made to determine if the number of occupants in the control zone has fallen below a second threshold, in which case the extra allocated resources can be unallocated.

Figure 5:
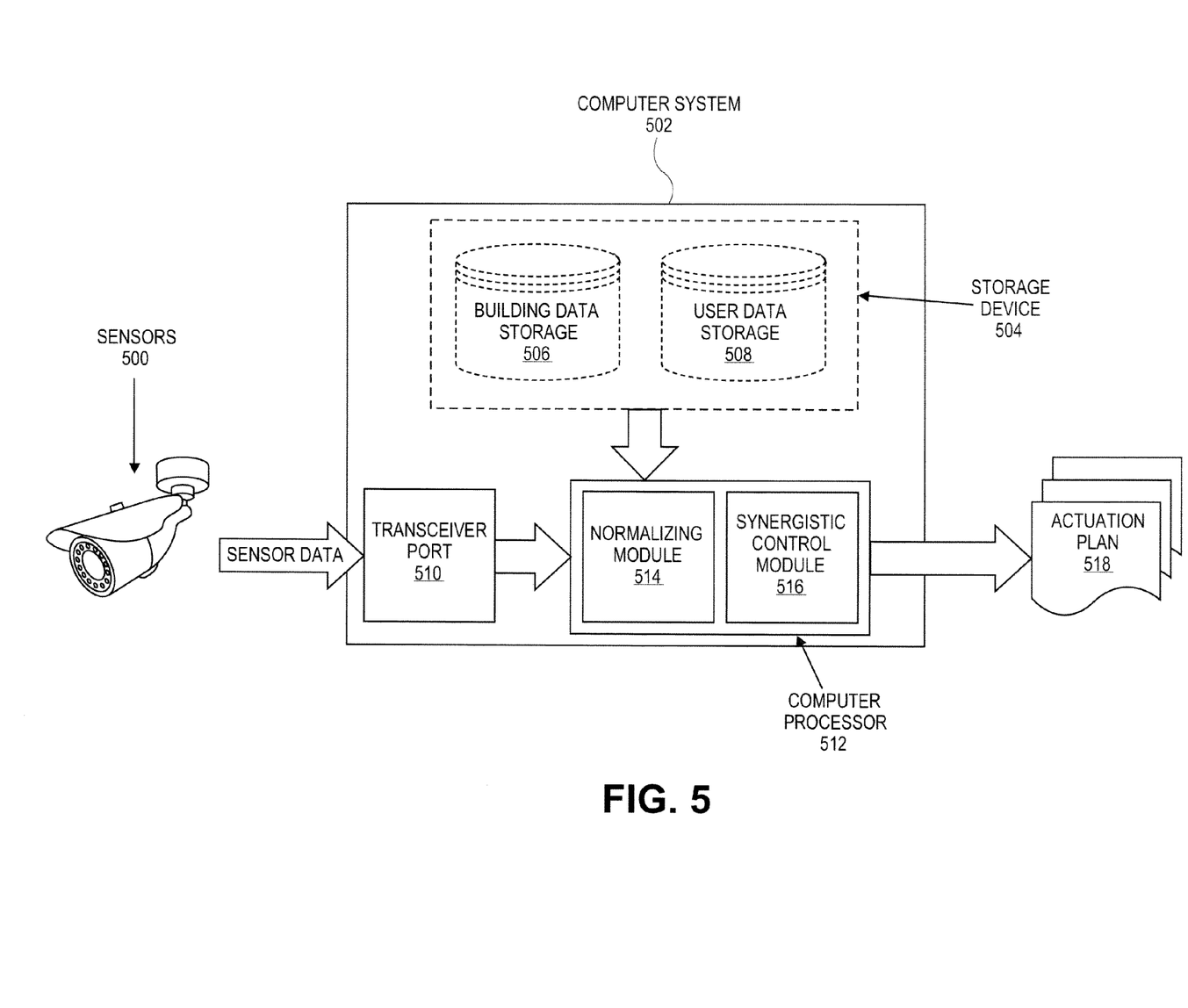
FIG. 5 is a diagram of one example embodiment of a computer system implementing a building automation system to synergistically sense occupancy inside a building.

FIG. 5 is a diagram of one example embodiment of a computer system implementing a building automation system to synergistically sense occupancy inside a building. This embodiment includes sensors 500 and computer system 502. Sensors 500 can include any number of sensors and any number of different types of sensors. In this embodiment, sensors 500 include at least one coarse-grained sensor and one fine-grained sensor. The data that is generated by sensors 500 is transmitted to transceiver port 510 in computer system 502. The data can be transmitted through a network, such as a local area network (LAN). Alternatively, sensors 500 can have direct connections to transceiver port 510.

Computer system 502 can be a distributed system, where multiple computers are coupled to each other through a network and each computer performs a different part of the process. Alternatively, computer system 502 can be a single computer. Computer system 502 can include a storage device 504 configured to store a building data storage 506 and a user data storage 508.

Building data storage 506 can be used to store information regarding the building, such as the sensor areas and control zones in the building, the spatial relationships between sensor areas and control zones, and the devices that are in each control zone. For example, the following data structures can be used to store building information. Depending on the embodiment, the following data structures can be modified and other data structures can also be used.

(1) Area: Area-ID, Label, Boundaries, Description>.

This example Area data structure can be used to store information regarding sensor areas or control zones in the building. The area-ID field can be used to store a unique identifier for a sensor area or control zone. The label field can be used to store a mnemonic name for the area or zone that is more easily recognized by users. The boundaries field can be used to store information regarding the spatial boundaries and size of the area/zone. The description field can store a description for the area/zone (e.g., whether the area is an office or meeting room).

(2) OccupancyInfo: <Area-ID, occupiedStatus, occupantsCount, User-IDs, Timestamp>.

The OccupancyInfo data structure can be used to store occupancy data for a given sensor area or control zone. Data generated by the sensors as well as information calculated from sensor data can be stored in this data structure. Area-ID is a unique identifier for the sensor area or control zone. OccupiedStatus is a binary value that indicates whether the area/zone is occupied. OccupantsCount indicates the number of occupants in the area/zone. User-IDs can be an array of unique identifiers corresponding to the users that are occupying the area or zone. Timestamp can be used to indicate the time that the data was recorded.

(3) EnergyConsumer: <Device-ID, Type, Control>

The EnergyConsumer data structure can store data defining any energy consuming device in a building, including electronics, appliances, and other equipment. The device-ID field can be used to store a unique identifier for each device. Additional information regarding the device, such as the type of device (e.g., light, HVAC, computer), control type (e.g., auto-on, auto-off, manual-on, and/or manual-off), and control commands (e.g., to automatically turn lights on/off or adjust thermostat temperature) can also be stored in this data structure.

(4) ConsumerInArea: <Device-ID, Area-ID, Timestamp>.

The ConsumerInArea data structure can be used to store relationships between devices and areas. The device-ID field can be used to store the unique identifier of a device, such as an HVAC unit, a lamp, or a computer. The area-ID field can be used to store the unique identifier of a corresponding area or zone that is affected by the device or contains the device. While most of these relationships are static (e.g., HVAC/lights have fixed locations), some relationships can also be dynamic (e.g., a mobile device can move from a cubicle to a meeting room). The timestamp field can be used with dynamic relationships to indicate when a device is associated with an area.

(5) SpatialRelation: <enclosingArea-ID, enclosedArea-ID, Timestamp>.

The SpatialRelation data structure can be used to store spatial relationships between different sensor areas and/or control zones. Each spatial relationship can be a physical relationship (e.g., a sensor area can enclose two control zones) or a logical relationship (e.g., to group several sensor areas). Some spatial relationships can be dynamic. For example, a grouping of areas can change to include different areas in the group. The timestamp field can be used to distinguish dynamic spatial relationships.

Storage device 504 can also include user data storage 508. User data storage 508 can be used to store information regarding the users of a building, such as the employees or visitors. For example, a data structure such as Occupant: <user-ID, name . . . > can be used to store unique identifiers for the occupants of a building and the names of the occupants. Depending on the different types of sensors used in the embodiment, other data can also be associated with each user, such as the user's badge identification number or the MAC address of the user's mobile device.

Computer system 502 also includes computer processor 512. Computer processor 512 can be any type of processing device including a general or central processing unit, an application specific integrated circuit (ASIC) or similar processing device. Computer processor 512 can be connected with storage device 504 and transceiver port 510 by a set of buses routed over a set of mainboards or similar substrates coupled to each other. Alternatively, computer processor 512 and storage device 504 can be connected through a network.

Computer processor 512 implements normalizing module 514 and synergistic control module 516. Normalizing module 514 translates sensor data that is received by transceiver port 510 from different types of sensors into normalized sensor data using any of the embodiments described herein. In some embodiments, normalizing module 514 utilizes the data stored in building data storage 506 and/or user data storage 508 to normalize the sensor data.

After the sensor data has been normalized, synergistic control module 516 processes the normalized data according to any of the embodiments described herein. An actuation plan 518 is generated as a result of the processing. Actuation plan 518 can be used to control energy consuming devices in a building, such as HVAC units and lighting, and thereby improve energy efficiency.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a computer system implementing a building automation system, the building automation system to synergistically sense occupancy inside a building, where the building includes a plurality of control zones, a coarse-grained sensor, and a fine-grained sensor, where the coarse-grained sensor generates a coarse data indicating that a user is in a first area of the building, where the first area includes a control zone in the plurality of control zones and is larger than the control zone, where the fine-grained sensor generates a fine data indicating that the user is in a second area of the building, where the second area is equal in size to or smaller than the control zone, and where the fine data is more accurate but less reliable than the coarse data, the method to improve energy efficiency in the building by generating an actuation plan for the control zone based on the coarse data and the fine data, the method comprising the steps of:

receiving the coarse data from the coarse-grained sensor, the coarse data having a first format;

receiving the fine data from the fine-grained sensor, the fine data having a second format different from the first format;

normalizing the coarse data into a normalized coarse data;

normalizing the fine data into a normalized fine data, wherein the normalized coarse data and the normalized fine data have a shared third format;

checking for an overlap between the first area of the building and the second area of the building using spatial boundary data and size of the first area of the building and the second area of the building;

calculating a change in occupancy in the control zone using the normalized coarse data where there is no overlap between the first area of the building and the second area of the building;

calculating the change in occupancy in the control zone using the normalized fine data where there is overlap between the first area of the building and the second area of the building;

generating the actuation plan for the control zone based on the change in occupancy in the control zone;

setting a number of area occupants for at least one of the normalized coarse data and the normalized fine data based on at least one of the coarse data and the fine data; and     determining a number of zone occupants in the control zone based on the number of area occupants;

checking whether the number of zone occupants in the control zone has reached a preset threshold; and     causing a resource to be allocated to a device in the control zone.

2. The method of claim 1, further comprising the steps of:

retrieving an area-identifier (ID) based on a sensor-identifier (ID) that is included in the coarse data or the fine data;

setting the area-ID for the normalized coarse data or the normalized fine data; and     retrieving a spatial relationship data based on the area-ID, wherein the spatial relationship data indicates a relationship between two areas in the building.

3. The method of claim 1, further comprising the steps of:

retrieving a user-identifier (ID) based on a device-identifier (ID) that is included in the coarse data or the fine data; and     setting the user-ID for the normalized coarse data or the normalized fine data.

4. The method of claim 1, further comprising the step of:

determining that the user is in an area smaller than the second area based on the overlap between the first area and the second area.

5. The method of claim 1, further comprising the steps of:

checking whether the control zone changed from an unoccupied status to an occupied status; and     causing an auto-on device in the control zone to turn on in response to the change in occupied status, where the auto-on device is any one of a lighting device, heating device, ventilation device, air conditioning device or safety device.

6. The method of claim 1, further comprising the steps of: checking whether the control zone changed from an occupied status to an unoccupied status; and causing an auto-off device in the control zone to turn off in response to the change in unoccupied status, where the auto-off device is any one of a lighting device, heating device, ventilation device, air conditioning device or safety device.

7. The method of claim 6, further comprising the step of:

waiting for a preset amount of time before causing the auto-off device to turn off.

8. A computer system implementing a building automation system, the building automation system to synergistically sense occupancy inside a building, wherein the building includes a plurality of control zones, a coarse-grained sensor, and a fine-grained sensor, wherein the coarse-grained sensor generates a coarse data indicating that a user is in a first area of the building, wherein the first area includes a control zone in the plurality of control zones and is larger than the control zone, wherein the fine-grained sensor generates a fine data indicating that the user is in a second area of the building, wherein the second area is equal in size to or smaller than the control zone, and wherein the fine data is more accurate but less reliable than the coarse data, the computer system to improve energy efficiency in the building by generating an actuation plan for the control zone based on the coarse data and the fine data, the computer system comprising:

a transceiver port configured to receive the coarse data from the coarse-grained sensor, and to receive the fine data from the fine-grained sensor, the coarse data having a first format and the fine data having a second format different from the first format; and     a computer processor coupled to the transceiver port and configured to execute a normalizing module and a synergistic control module,     the normalizing module configured to normalize the coarse data into a normalized coarse data, and to normalize the fine data into a normalized fine data, wherein the normalized coarse data and the normalized fine data have a shared third format, and     the synergistic control module configured to check for an overlap between the first area of the building and the second area of the building using spatial boundary data and size of the first area of the building and the second area of the building, to calculate a change in occupancy in the control zone using the normalized coarse data in response to finding that there is no overlap between the first area of the building and the second area of the building, to calculate the change in occupancy in the control zone using the normalized fine data in response to finding that there is overlap between the first area of the building and the second area of the building, and to generate the actuation plan for the control zone based on the change in occupancy in the control zone, wherein the normalizing module is further configured to set a number of area occupants for at least one of the normalized coarse data and the normalized fine data based on at least one of the coarse data and the fine data, and to determine a number of zone occupants in the control zone based on the number of area occupants, and wherein the synergistic control module is further configured to check whether the number of zone occupants in the control zone has reached a preset threshold, and to cause a resource to be allocated to a device in the control zone.

9. The computer system of claim 8, further comprising:
a storage device coupled to the computer processor and configured to store a building data storage,
the building data storage configured to store a sensor-identifier (ID) with a corresponding area-identifier (ID), and to store a spatial relationship data, wherein the spatial relationship data indicates a relationship between two areas in the building,
wherein the normalizing module is further configured to retrieve the area-ID from the building data storage based on the sensor-ID that is included in the coarse data or the fine data, to set the area-ID for the normalized coarse data or the normalized fine data, and to retrieve the spatial relationship data based on the area-ID.

10. The computer system of claim 8, further comprising:
a storage device coupled to the computer processor and configured to store a user data storage,
the user data storage configured to store a device-(identifier) ID with a corresponding user-identifier (ID),
wherein the normalizing module is further configured to retrieve the user-ID from the user data storage based on the device-ID that is included in the coarse data or the fine data, and to set the user-ID for the normalized coarse data or the normalized fine data.

11. The computer system of claim 8, wherein the synergistic control module is further configured to determine that the user is in an area smaller than the second area based on the overlap between the first area and the second area.

12. The computer system of claim 8, wherein the synergistic control module is further configured to check whether the control zone changed from an unoccupied status to an occupied status, and to cause an auto-on device in the control zone to turn on in response to the change in occupied status, where the auto-on device is any one of a lighting device, heating device, ventilation device, air conditioning device or safety device.

13. The computer system of claim 8, wherein the synergistic control module is further configured to check whether the control zone changed from an occupied status to an unoccupied status, and to cause an auto-off device in the control zone to turn off in response to the change in unoccupied status, where the auto-off device is any one of a lighting device, heating device, ventilation device, air conditioning device or safety device.

14. The computer system of claim 13, wherein the synergistic control module is further configured to wait for a preset amount of time before causing the auto-off device to turn off.

* * * * *